United States Patent [19]

Lindsay et al.

[11] Patent Number: 4,964,738
[45] Date of Patent: Oct. 23, 1990

[54] ELECTRICAL CONDUCTOR OF HIGH MAGNETIC PERMEABILITY MATERIAL FOR AUDIO CIRCUITS

[76] Inventors: David S. Lindsay, 585 Manet Ter., Sunnyvale, Calif. 94087; Calvin J. Geyer, 3833 Park Blvd., #20, Palo Alto, Calif. 94306

[21] Appl. No.: 271,202

[22] Filed: Nov. 14, 1988

[51] Int. Cl.$^5$ ............................................. H04B 3/00
[52] U.S. Cl. ........................................ 381/97; 381/28; 381/77; 381/124; 174/126.1
[58] Field of Search ................ 381/28, 124, 98, 97, 381/77; 174/126.1

[56] References Cited

U.S. PATENT DOCUMENTS

| | | |
|---|---|---|
| 1,905,215 | 4/1933 | Cadieux ................................. 381/86 |
| 4,105,865 | 8/1978 | Guillory ................................. 381/77 |
| 4,365,168 | 12/1982 | Chaput et al. ...................... 200/5 A |
| 4,672,675 | 6/1987 | Powell et al. |

Primary Examiner—Forester W. Isen
Attorney, Agent, or Firm—Skjerven, Morrill, MacPherson, Franklin & Friel

[57] ABSTRACT

An improvement in the high frequency sound quality of audio circuits using copper electrical interconnections is realized by replacing copper electrical interconnections with interconnections of a material exhibiting a greatly reduced skin depth at audio frequencies. At the moment, without the availability of practical room-temperature superconductors, the most practical method is to use a material possessing a high magnetic permeability. By this means, phase dispersion due to the skin effect is virtually eliminated.

5 Claims, 1 Drawing Sheet

ELECTRICAL CONDUCTOR OF HIGH MAGNETIC PERMEABILITY MATERIAL FOR AUDIO CIRCUITS

BACKGROUND OF THE INVENTION

When an electromagnetic wave propagates along the length of a wire, the electromagnetic wave, generated by the movement of electrons within the wire, penetrates into the wire somewhat, this penetration being a result of the "skin effect" phenomenon. The intensity of the signal that penetrates into the wire decreases exponentially with distance into the wire. The penetration into the wire, called the "skin depth", is given by:

$$\delta = \frac{504}{\sqrt{\sigma \mu f}} \text{ meters, where} \tag{1}$$

$\delta$ (delta) is the skin depth (meters);
$\sigma$ (sigma) is the electrical conductivity (mhos/meter);
$\mu$ (mu) is the relative magnetic permeability (1.0 for air); and
f is the frequency in hertz.
For copper, equation 1 yields approximately:

$$\delta = \frac{0.066}{\sqrt{f}} \text{ meters.} \tag{2}$$

The above formulas can be found in most electromagnetic theory text books.

There are two important phenomena associated with skin depth:

1. The signal strength decreases exponentially with distance into the wire, as follows:

$$S = S_o e^{-L/\delta}, \tag{3}$$

where
S is the signal strength inside the wire, at a depth L below the surface;
$S_o$ is the signal strength at the surface of the wire;
$\delta$ is the skin depth given by equation 1 or 2 above;
L is the distance into the wire where the signal S is measured; and
e is the base of natural logarithms.

2. The speed of propagation of electromagnetic signals in good conductors is drastically reduced from the speed in a vacuum ($3 \times 10^8$ m/sec). The speed of propagation in a conductor (v) is exactly that required for the skin depth to be equal to the wavelength ($\lambda$) divided by two pi, or expressed mathematically, $$\delta = \frac{504}{\sqrt{\sigma \mu f}} = \frac{\lambda}{2\pi}, \text{ and} \tag{4}$$

$$v = f\lambda. \tag{5}$$

Thus, by combining equations 4 and 5, $$v = 3,167 \, (f/\sigma\mu)^{\frac{1}{2}} \text{ meters/second.} \tag{6}$$

For copper, this results in a speed of propagation equal to $$v = 0.415 \sqrt{f} \text{ meters/second.} \tag{7}$$

In copper, the speed of propagation of an electromagnetic wave is approximately: 1.9 meters per second (m/sec) at 20 Hz; 13 m/sec at 1 kHz; and 60 m/sec at 20 kHz.

Thus, a signal propagating into the interior of a conducting wire experiences a substantial delay (one radian of phase for each $\delta$ into the wire) and also experiences an attenuation by a factor of e for each $\delta$ into the wire.

It is possible that such a signal, upon reaching the other side of the wire, can reemerge from the wire and continue propagating down the wire. But due to the very slow speed of propagation within the wire, this wave that has traveled through the wire and emerged from the other side may be substantially and audibly delayed.

The purpose of this invention is to minimize audible effects caused by such propagation through the thickness of a wire and reemergence from the other side.

The equations above show that the skin depth ($\delta$) depends on the frequency of the audio signal, as well as the conductivity and magnetic permeability of the conductor. The vast majority of electrically conducting wire is made of copper, for which the above formulas yield a skin depth of approximately: 15 millimeters (mm) at 20 Hertz, 2 mm at 1 kHz, and 0.5 mm at 20 kHz. The range of human hearing is usually quoted as 20 Hz to 20 kHz, although many audio equipment designers strive for a greater bandwidth in order to ensure high quality in the audible range, in addition to addressing those individuals whose hearing may be better than normal.

Copper wires used in the circuitry of audio recording and playback processing and/or amplification equipment, including preamplifiers, mixers, amplifiers, compact disk players, musical instrument electronics, phonographs, tuners, tape and cassette players, microphones, equalizers, loudspeakers, headphones, etc., and the interconnects among these components, are generally considerably thinner than the skin depth of copper at all but the very highest audio frequencies. Thus, as mentioned above, an electromagnetic wave, representing an audio signal, carried by a typical copper wire in an audio circuit can easily propagate through the entire width of the wire, emerge from the other side, and then interfere with the electromagnetic wave present on this other side, perhaps producing audible distortion of the resulting audio signal. This distortion is due to the time delay encountered by the signal while propagating through the thickness of the wire. This distortion is not the "harmonic distortion" that is frequently measured and used as a figure of merit for audio equipment; rather, it is a form of phase distortion, since the phases of different frequencies will be affected differently. Therefore, this distortion mostly affects the transients in music reproduction, which contain a wide range of higher frequency signals. It does not appear to be previously realized that non-zero skin depth can cause this type of distortion.

Since the velocity of propagation through the wire varies with frequency in accordance with equation 6, the resulting signal suffers from the phenomenon of dispersion, wherein different frequencies in a signal propagate at different speeds through the thickness of a conductor and consequentially a sharp precise pulse becomes fuzzy and smeared out over time.

Consider for example a copper wire of 0.5 mm diameter (a medium to large diameter wire when used to connect components, such as resistors and capacitors, in an audio circuit). The calculated skin depth at audio frequencies is much larger than the wire diameter. At the lower audio frequencies, there is little distortion because the phase delays are negligible with respect to the periods of the lower frequencies. However, at the high audio frequencies, the interference caused by the addition of out-of-phase electromagnetic waves may become audible since the propagation delays are more significant with respect to the periods of the higher audio frequencies. Specifically, the time delays due to the electromagnetic wave passing through a 0.5 mm diameter copper wire are approximately: 270 $\mu$s at 20 Hz (20 Hz having a 0.05 second period); 38 $\mu$s at 1 kHz (1 kHz having a 1,000 $\mu$s period); and 8.5 $\mu$s at 20 kHz (20 kHz having a 50 $\mu$s period).

To virtually eliminate the deleterious effects of the audio signal propagating from one side of a wire to the other, the wire should be made as thick as several skin depths at the lowest frequency, typically about 20 Hz. The reason for desiring to make the wire very thick with respect to the skin depth is that, according to equation 3, the interfering signal that propagates through the wire is then significantly attenuated—by a factor of 10 for every 2.3 $\delta$ of thickness.

Although thickening the wire (with respect to skin depth) will also increase the phase delay, the goal is to employ the increased attenuation to eliminate the resulting distortion. For copper wire, the required thickness would be several centimeters, which is impractical in audio circuits.

SUMMARY OF THE INVENTION

Our inventive solution to eliminate the above-described phase dispersion of audio signals caused by the skin effect phenomenon in conductors carrying audio frequencies is to use a wire of conventional thickness, but exhibiting greatly reduced skin depth. Since skin depth at a particular frequency is partly a function of magnetic permeability, as shown by equation 1, by using wires with high magnetic permeability in an audio circuit, phase dispersion caused by the skin effect can be virtually eliminated at higher audio frequencies. Even though wires formed with practical materials of a high magnetic permeability generally exhibit reduced electrical conductivity, the reduced conductivity is insignificant in high impedance audio circuits, such as in the preamplifier stage. Using wire formed by magnetic materials has been shown in experiments to in fact result in substantially improved sound quality from the audio systems employing them.

DETAILED DESCRIPTION OF THE INVENTION

Figure 1:
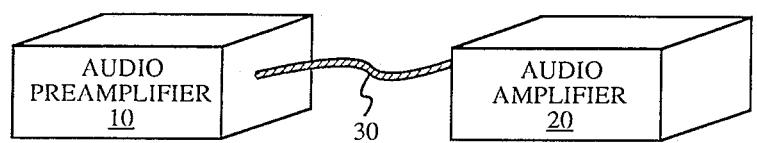
FIG. 1 shows one embodiment of the invention where a wire interconnects two components of an audio system.

Phase dispersion in audio systems due to the skin effect may be virtually eliminated by using wire to couple components within the audio circuits, or to couple together audio equipment, which is comprised of material with a substantially reduced skin depth. From equation 1, this may be accomplished by employing wire either (1) of increased electrical conductivity or (2) of a material with a large magnetic permeability. Unfortunately, the only metal with higher electrical conductivity than copper is silver, and the improvement in skin depth is only approximately 3 percent—a negligible improvement at great cost. With the advances in room temperature superconductors, an economic superconductor may be developed that, if used in an audio circuit, would eliminate this phase dispersion. Alternatively, materials with large magnetic permeability are readily available and can easily and economically be formed into wires. Conducting materials with magnetic permeability ($\mu$) in the range 10,000 to 100,000 (where the $\mu$ of air is 1) are available. Such materials have an electrical conductivity that is only a few percent of copper's conductivity, but the result is nevertheless a substantial reduction in skin depth and, consequently, lowered phase dispersion of audio signals. For example, if the electrical conductivity of a wire with a high magnetic permeability is 5 percent (i.e., 1/20) that of copper and the magnetic permeability is 50,000 (the parameters of a typical specialty magnetic material), equation 1 shows that the skin depth is reduced from that of copper by a factor of approximately $(50,000/20)^{\frac{1}{2}}$ or 50. Therefore, a 0.5 mm diameter wire of such material would behave like a copper wire 25 mm in diameter. The attenuation of the audio signal propagating in the desired manner along the wire due to the decreased electrical conductivity is negligible in audio circuits having a high impedance.

In addition to the wire material having high magnetic permeability, it is desirable for the material to have low hysteresis losses and not retain a magnetic field. Materials manufactured specifically for use as magnetic shields have these desired properties.

There are three classes of materials which exhibit a shallow skin depth at audio frequencies and, therefore, act to reduce phase dispersion in audio circuits. One class is materials that happen to be magnetic. Examples of such materials are iron, steel, magnetic stainless steel, nickel and cobalt. Their magnetic properties are not ideal (relatively low $\mu$ in the range 100 to 1,000), but they have been tested by these inventors and are indeed superior to copper as conductors of audio signals. These materials are standard materials that are used in industry for their strength, rigidity, ease of welding, corrosion resistance, thermal expansion coefficient, or some other physical or mechanical property unrelated to magnetism, but happen to be magnetic.

Another class of magnetic materials that may be used in audio circuits are specialty magnetic materials. These materials have been developed specifically for their magnetic properties. Examples includes grain-oriented nickel, chemically pure iron, and alloys of iron and nickel (with small amounts of other elements) going under such trade names as "mu-metal", "molly permalloy", "supermendur", "vanadium permendur", "hy-mu 80", "permendur", "permalloy". These are the materials of choice and Carpenter Technology's hy-mu 80 has been shown to provide the best performance. All such special magnetic materials, with a $\mu$ over 1,000 are to be included in any definition of magnetic material used in the preferred embodiment of this invention.

Another class of materials that would reduce skin depth and hence provide less phase dispersion in audio circuits are room-temperature superconductors, which are yet undeveloped.

In one embodiment of our invention, all wires and printed circuit board connections within an audio circuit are formed with a high $\mu$ material, such as "hy-mu 80". Furthermore, all connecting wires between audio equipment (e.g., wire coupling phonograph to preamplifier, preamplifier to amplifier, etc.) are formed with a high $\mu$ material. This is shown in FIG. 1 where preamplifier 10 is shown coupled to amplifier 20 via flexible wire 30 made of a high $\mu$ material.

Multiple experiments were conducted where a group of people were asked to identify the audio equipment with less distortion at high frequencies. In all experiments the group identified the equipment incorporating the high $\mu$ wires as having less distortion than identical equipment using standard copper wire. The distortion in equipment using standard copper wire was most apparent when reproducing sounds with considerable low-level transient detail, such as produced by reverberation in a concert hall. Pure electrical measurement of phase dispersion due to skin effect is difficult, since even though an electronically produced sine wave of high audio frequency conducted through a copper wire will contain interference due to skin effect, the resulting wave will still be a sine wave of identical frequency but having a slight delay. Such a delay is very difficult to separate from other delays in electronic equipment. Hence, improved sound quality is best determined at the present time by human perception since the human ear can discern very subtle frequency-dependent phase delays.

The problem with phase dispersion in audio circuits due to skin effect has not been previously identified to the inventor's knowledge, since there have been no audio circuits using wire of a high $\mu$ material to compare with identical audio circuits using standard copper wire. Hence, the problem of phase dispersion and the identification of the source of the phase dispersion in audio circuits have been heretofore unknown.

Other embodiments and applications of our invention will become obvious to those ordinarily skilled in the art, and our invention is only limited by the scope of the following claims.

We claim:

1. An audio circuit for processing audio frequencies, wherein electrical conductors connecting various components comprising the audio circuit are formed of a conductive material of magnetic permeability greater than 1,000.

2. The audio circuit of claim 1 wherein said electrical conductors are in the form of wires.

3. The audio circuit of claim 1 wherein said electrical conductors couple together components within audio equipment selected from the group consisting of audio recording and playback processing and/or amplification equipment, including preamplifiers, mixers, amplifiers, compact disk players, musical instrument electronics, phonographs, equalizers, tuners, tape and cassettes players, microphones, loudspeakers, and headphones.

4. The audio circuit of claim 1 wherein said components include resistors, capacitors, and semiconductor elements.

5. The audio circuit of claim 1 further comprising said electrical conductors of a magnetic permeability greater than 1,000 coupling together audio equipment selected from the group consisting of audio recording and playback processing and amplification equipment, including preamplifiers, mixers, amplifiers, compact disk players, musical instrument electronics, phonographs, equalizers, tuners, tape and cassettes players, microphones, loudspeakers, and headphones.

* * * * *